Oct. 21, 1969

O. J. PARKER 3,473,333

ULLAGE COMPENSATOR

Filed Nov. 24, 1967

INVENTOR.
OTIS J. PARKER

BY

ATTORNEYS

INVENTOR.
OTIS J. PARKER

ATTORNEYS

United States Patent Office 3,473,333
Patented Oct. 21, 1969

---

3,473,333
ULLAGE COMPENSATOR
Otis J. Parker, Chesapeake, Va., assignor to the United States of America as represented by the Administrator of the National Aeronautics and Space Administration
Filed Nov. 24, 1967, Ser. No. 685,399
Int. Cl. F02k 9/02
U.S. Cl. 60—259                    8 Claims

---

ABSTRACT OF THE DISCLOSURE

A piston-type ullage compensator allowing expansion of liquid rocket fuel in a filled fuel tank due to temperature changes and for providing sustained liquid rocket fuel to a rocket engine under zero $g$ conditions wherein pressurized gas flow effects rupture of a burst diaphragm at the fuel tank inlet and thereafter exerts gaseous pressure on a slidable piston. Movement of the piston causes an increasing pressure on the liquid fuel until a second burst diaphragm at the fuel tank outlet ruptures to permit the pressurized fuel flow to reach the rocket engine.

---

The invention described herein was made by an employee of the National Aeronautics and Space Administration and may be manufactured and used by or for the Government of the United States of America without the payment of any royalties thereon or therefor.

This invention relates to an automatic ullage compensator for use in a completely filled fuel tank and serves to provide sustained pressurized liquid rocket fuel flow to a rocket engine under zero $g$ conditions. A particular problem arises in obtaining uniform pressurized delivery of any liquid fuel, due to probable propellant separation under zero $g$ conditions, when an empty space is present in the fuel tank. When the propellant tanks are properly filled, no free ullage space may exist which will allow room for propellant separation during zero $g$ conditions. An allowance for expansion is necessary in any sealed liquid container because of temperature differences during long-term storage. In the present invention this allowance or spacing is confined to a separate unit within the tank which permits fuel expansion while also permitting the tank to be completely filled. Due to the corrosive nature of the propellants used, only a limited number of compatible materials are available for making suitable ullage compensation.

Previously, ullage compensators of this general type that have been considered included (1) a flexible bellows machined from a Teflon rod and (2) a bladder fabricated from Teflon film. Both of these systems require a thin area of rupture zone which, upon operation, would break when the maximum expansion of the bellows or bladder is reached. Some of the disadvantages of these methods are (1) the possibility of fragments of the ruptured material clogging the propellant lines, (2) the difficulty of controlling the volume of the bladder while filling the tank, and (3) the necessity of a development program during which a large number of units would have to be tested to rupture condition in order to supply realistic reliability and qualification data.

Accordingly, it is an object of the present invention to provide a system for providing uniform sustained liquid fuel flow to a rocket engine under zero $g$ conditions.

Another object of the present invention is to provide a ullage compensation system in which a separate unit provides automatic ullage compensation for completely filled fuel tanks.

Another object of the present invention is a novel piston and chamber system for providing automatic ullage compensation for completely filled fuel tanks and uniform pressure to a liquid rocket fuel under zero $g$ conditions.

A further object of the present invention is a novel fuel system for a liquid propellant rocket.

A further object of the present invention is a novel system for initiating uniform pressurized liquid rocket fuel flow to a rocket engine under zero $g$ conditions.

According to the present invention, the foregoing and other objects are attained by providing a piston-type ullage compensator so constructed and arranged as to be self-adjusting during thermal expansion of the propellant in the fuel tank. The piston compensator of the present invention includes an inner cylinder, an outer cylinder and a specially designed piston. The length and diameter of the inner cylinder is determined by the compensation desired for a particular system with a flange being provided at the bottom of the inner cylinder to serve as a stop for the piston. A series of holes located a distance from the bottom of the cylinder greater than the length of the piston member provides a passage to the spacing between the inner and outer cylinders. A series of similar holes located near the top of the outer cylinder provide a passageway from the spacing between the inner and outer cylinders to the outside of the outer cylinder. The assembled cylinders are secured and sealed in a conventional manner adjacent the flanged end. This assembly with the piston installed and properly positioned to provide ullage compensation is fitted in the top of the propellant tank and secured in place circumferentially about the tank inlet with a suitable fitting in the tank inlet providing a tube connection. A suitable spacer may be inserted through the tank inlet to insure proper location of the piston while the tank is being filled. After the tank is filled, a burst diaphragm is installed in each end of the tank to seal the tank inlet and outlet and thereby render the tank ready for storage or use.

A more complete appreciation of the invention and many of the attendant advantages thereof will be readily apparent when the same becomes better understood by reference to the following detailed description when considered in connection with the accompanying drawings wherein.

Figure 1:
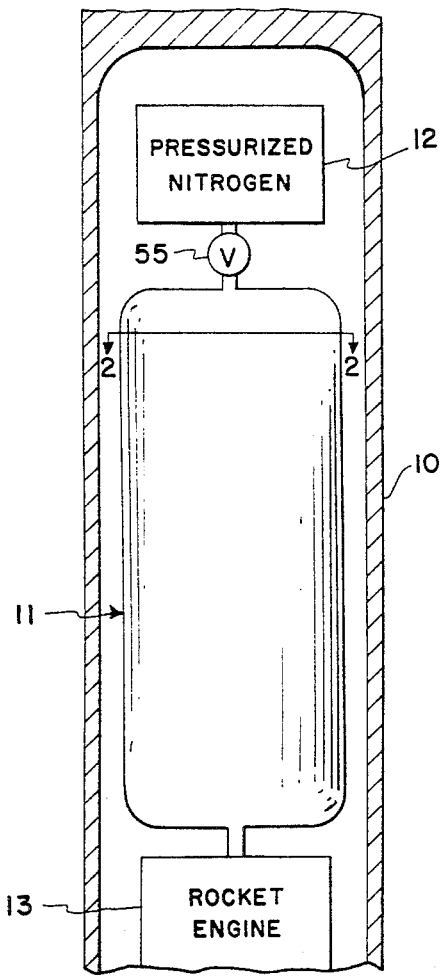
FIG. 1 is a schematic representation of part of a liquid propellant rocket.

Referring now more particularly to the drawings wherein like reference numerals designate identical parts throughout the several views, and more particularly to FIG. 1, there is shown a rocket vehicle segment 10 including a liquid fuel tank 11, a source of pressurized nitrogen 12 and a rocket engine 13. Rocket segment 10 is designed to be ignited and started in space, or under zero $g$ conditions, after being propelled to the spatial environment by means of another booster rocket system, not shown.

Figure 2:
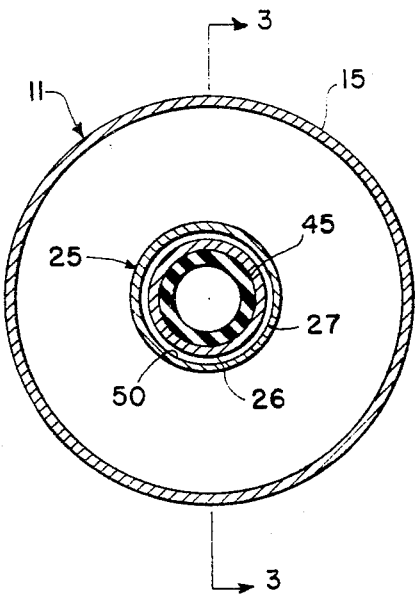
FIG. 2 is a section of the propellant tank taken along lines 2—2 of FIG. 1.
Figure 3:
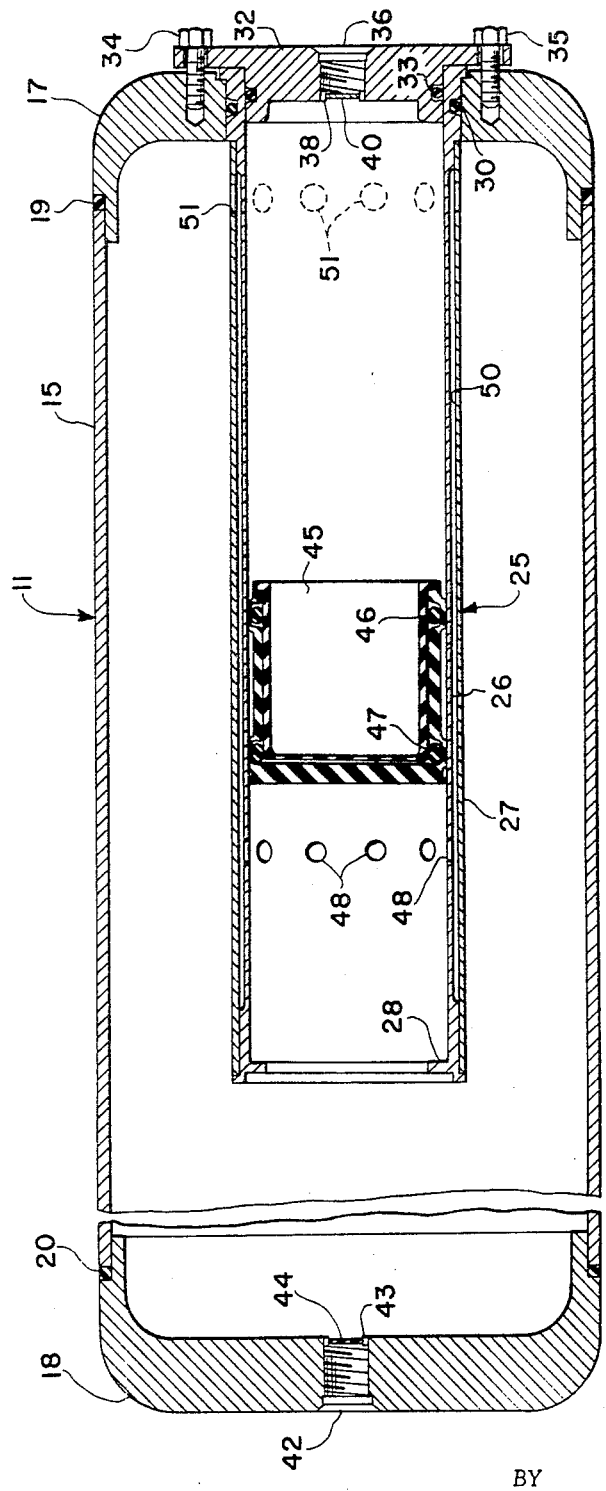
FIG. 3 is a sectional view of a liquid propellant tank taken along lines 3—3 of FIG. 2 and illustrating the ullage compensation system of the present invention.

Referring now to FIGS. 2 and 3, the liquid fuel tank 11 is shown in section and illustrates the ullage compensation mechanism of the present invention. As shown therein, fuel tank 11 includes sidewall section 15 and top and bottom end caps designated, respectively, 17 and 18. End caps 17 and 18 are secured to sidewall section 15 in a conventional manner, such for example, welding or threading with suitable seal mechanism, as designated by reference numerals 19 and 20, being provided between each end cap and the sidewall section. The ullage compensator of the present invention is generally designated by reference numeral 25 and includes as a unit a tubular cylinder having a pair of spaced wall sections, designated respectively as inner wall 26 and outer wall 27, secured together in spaced relationship. An inturned flange 28 is provided at one end of the inner tubular wall 26 as will be further explained hereinafter. The ends of the tubular cylinders 26 and 27 are secured together adjacent flange 26 in a conventional manner as by swaging. The other end of the tubular members 26 and 27 are also secured together in a conventional manner, as by welding, or the like. Tubular members 26 and 27 are formed of a suitable aluminum alloy, or the like, which is chemically inert to the propellant fuels adapted to be used in fuel tank 11.

The ullage compensator unit 25 is slidably positioned within end cap 17 of fuel tank 11 and secured in fluid-tight relationship therewith by a suitable O-ring seal 30. A slidable end fitting 32 closes the end of the ullage compensator unit 25 that is positioned in end cap 17 with suitable O-ring seal 33 insuring fluid-tight connection between the parts. End fitting 32 is secured to end cap 17 by a plurality of suitable bolts, two of which are shown in FIG. 3 and designated, respectively, by reference numerals 34 and 35. The center section of end fitting 32 provides a tapped inlet 36 for fuel tank 11. A threaded washer 38 is screwed into tapped inlet 36 to provide a seal for tank 11 by the integrally attached burst diaphragm 40. A tapped outlet for tank 11 is provided in end cap 18 and designated by reference numeral 42. Outlet 42 is sealed in identical fashion to inlet 36 by a threaded washer member 43 and its integrally attached burst diaphragm 44.

The double walled piston member 45 is of cup-shaped configuration and slidably received within inner tubular wall 26 with the open end of the cup-shaped configuration being directed toward the fuel tank inlet 36. Piston member 45 is slidable between flange 28 on tubular wall 26 and the end fitting 32. Piston 45 is constructed of a pair of Teflon cups with a pair of silicon rubber O-ring seals, designated respectively by reference numerals 46 and 47, fitted into internally machined grooves in the outer Teflon cup to provide the sealing rings of the piston 45 with the necessary resilience of which the Teflon by itself is incapable. The material thickness in the groove areas of the outer cup is kept to a minimum in order to obtain axial and radial flexibility. The inner cup supports the O-ring internal diameter, allows for limited axial movement between the inner and outer cups, and makes possible the complete encapsulation of O-rings 46 and 47 with the seam between the two cups being sealed. This sealing is effected in a conventional manner, as by heating, at the cup ends. The limited axial movement between the two cups allows the sealing force at the O-ring areas to increase when pressure is applied to either end of the piston. The complete encapsulation of O-rings 46 and 47 provides their protection from the corrosive effects of the propellant fuels utilized in tank 11. A plurality of circumferentially disposed openings are provided in the inner tubular member 26 and designated by reference numeral 48. Openings 48 are spaced from flange 28, at least a distance greater than the length of piston member 45 to thereby provide a passage to the spacing between the cylinder walls 26 and 27. A similar row of circumferentially disposed holes 51 are disposed in outer tubular member 27 adjacent the fuel tank inlet to provide a passageway from spacing 50 between tubular members 26 and 27 to the interior of fuel tank 11.

The operation of the present invention is now believed to be apparent. A suitable spacer, such for example a thin rod or the like, not shown, is inserted through the tube connecting hole or tank inlet 36 to insure proper location of piston 45 while the tank is being filled. Liquid fuel is received through outlet port 42 for filling of tank 11. After the tank is filled, port 42 is sealed by its burst diaphragm 44, the piston spacer is removed and burst diaphragm 40 and its integrally attached washer 38 is threadedly secured in tapped inlet 36 and tank 11 is ready for storage or use. Tank 11 is completely filled and the only open spacing therein to permit fuel expansion or contraction due to temperature changes is provided by the separate unit containing slidable piston 45. Thus, tank 11 becomes a closed system when filled with fuel and sealed by burst diaphragms 40 and 44. The slight volume of air between the open end of piston 45 and burst diaphragm 40 will be under the same pressure as the liquid fuel contained in the tank 11. Upon a decrease in temperature the liquid fuel will decrease slightly in volume causing a negative pressure on the liquid side of piston 45 which is balanced by the differential pressure on the gas or air side of the piston. Similarly, upon an increase in temperature the liquid fuel expands slightly causing a positive pressure on the liquid side of piston 45 which is balanced by the differential pressure on the gas or air side of the piston.

In use, the source of pressurized nitrogen 12 in rocket 10 (FIG. 1) is attached to tap inlet 36 and the system is ready for operation. During a space flight when it is necessary to provide fuel to rocket engine 13 from tank 11, the pressurized nitrogen source 12 is actuated by suitable valve system 55 or the like (FIG. 1) to direct pressurized force against burst diaphragm 40. When this pressure reaches the critical point of burst diaphragm 40, the diaphragm will burst and the pressurized nitrogen is directed against piston 45 with subsequent movement of piston 45 causing an increased pressure on the fuel in tank 11. The increasing pressure in tank 11 by the pressurized nitrogen gas acting on piston 45 will result in an increased pressure on the liquid rocket fuel and cause rupture of burst diaphragm 44. As the pressure exerted by piston 45 increases, the piston is slidably moved toward flange 28 of ullage compensator 25 and upon contact with flange 28, circumferentially disposed openings 48 will be exposed to the nitrogen gas flow. The continuous pressurized gas flow will then move into the spacing 50 between tubular members 26 and 27 and, pushing all of the liquid fuel before it, move through circumferential openings 51 into tank 11. Prior to this time, as mentioned hereinbefore, the pressure on the rocket fuel has reached the extent where rupturable diaphragm 44 will burst to permit the flow of the pressurized fuel through outlet 42 to the rocket engine. Upon engine start, the acceleration forces exerted on the system, coupled with the pressurized gas flow, will insure continuous and sustained flow to the rocket engine even under the spatial zero g conditions.

It is thus seen that by use of the present invention of an automatic ullage compensation system serves also as a pressurizing system enabling fuel tank 11 to be rapidly pressurized and, upon rupture of burst diaphragm 44, permit continuous and sustained pressurized fuel flow to the rocket engines, even under zero g gravitational conditions.

Although the invention has been described and illustrated in detail to a specific embodiment thereof, it is to be understood that this description is by way of illustration of an example only and is not to be taken as limiting on applicant's invention. For example, although burst diaphragms 40 and 44 have been described as being integrally formed with respective threaded washer members it is to be understood that any other suitable and conventional burst diaphragm structure may be substituted for the structure described without departing from the spirit or scope of the invention. Obviously, there are many other modifications and variations of the present invention possible in the light of the above teachings.

What is claimed and desired to be secured by Letters Patent of the United States is:

1. Apparatus for providing automatic ullage compensation in completely filled fuel tanks and insuring rocket starting while providing uniform sustained liquid fuel flow to a rocket engine under zero g conditions comprising, in combination:
- a rocket having at least one rocket engine capable of being started under zero g conditions,
- a fuel tank containing liquid fuel for said rocket engine, said fuel tank being provided with an inlet and an outlet and in fluid connection with said engine,
- a source of pressurized nitrogen disposed in said rocket in fluid connection with said fuel tank inlet,
- first rupturable seal means interrupting the fluid connection of said nitrogen source and said fuel tank,
- means for activating said pressurized nitrogen source to thereby rupture said first pressure responsive means,
- second rupturable seal means interrupting the fluid connection of said rocket engine and said fuel tank,
- means within said fuel tank for providing automatic ullage compensation for said tank,
- said means within said fuel tank serving to receive nitrogen from said source and transferring the gaseous pressure therefrom to the surface of liquid fuel in said fuel tank to thereby effect rupture of said second seal means and permit pressurized fuel flow to said rocket engine,
- said means within said fuel tank for providing automatic ullage compensation for said tank and for receiving nitrogen from said source and transferring the gaseous pressure therefrom to the surface of liquid fuel in said fuel tank including:
    - a tubular cylinder having an open end and being secured at the other end inside of said fuel tank in circumferential relationship about said fuel tank inlet,
    - said tubular cylinder being formed of a pair of spaced walls,
    - an internal annular flange provided integral with the open end of said cylinder, and
    - a piston member positioned within said cylinder and slidably movable between said tank inlet and said annular flange.

2. Apparatus as in claim 1 wherein a first plurality of circumferentially disposed openings are provided in the inner wall of said tubular cylinder and a distance spaced from said internal annular flange at least greater than the length of said piston to provide passageways to the spacing between the cylinder walls, and a second plurality of circumferentially disposed openings are provided in the outer wall of said tubular cylinder adjacent said fuel tank inlet.

3. Apparatus as in claim 2 wherein said piston member is of cup-shaped configuration with the open end thereof directed toward said fuel tank inlet.

4. Apparatus as in claim 2 wherein said piston member is adjustably disposed within said tubular cylinder prior to filling of said fuel tank with the spacing between said piston and said tank inlet serving as the sole ullage in said tank.

5. Apparatus as in claim 4 wherein said piston member is formed of a pliable material chemically inert to the normally corrosive liquid rocket fuels.

6. Apparatus as in claim 4 wherein said cup-shaped piston is of double wall construction and a pair of spaced O-ring members are provided between said double walls at the points of contact of said piston and said cylinder.

7. A fuel system for a liquid propellant rocket capable of providing automatic ullage compensation for completely filled fuel tanks and providing sustained fuel flow to the rocket engine under zero g conditions comprising, in combination:
- a rocket having at least one rocket engine and adapted to be ignited under zero g condition after coasting in space,
- a tank of liquid fuel for said rocket engine,
- an inlet and an outlet for said tank,
- means in operative relationship with said tank inlet for providing pressurized gaseous flow to said tank,
- said means including a tubular cylinder and a slidable piston housed within said cylinder,
- said cylinder confining the ullage of said tank with the ullage being formed between said piston and said tank inlet,
- pressure rupturable means sealing said tank outlet and adapted to normally interrupt flow of said fuel to said rocket engine, whereby:
    - said piston slidably moves within said cylinder upon changes in fuel volume due to temperature variations and when said means for providing pressurized gaseous flow is actuated, the pressurized gas will act on said piston to thereby increase the pressure on said liquid fuel causing rupture of said pressure rupturable means and thereafter the gas will displace the liquid fuel in said tank and cause uniform flow of said fuel to said rocket engine.

8. A fuel system for a liquid propellant rocket capable of providing automatic ullage compensation for completely filled fuel tanks and providing sustained fuel flow to the rocket engine under zero g conditions, comprising:
- a fuel tank containing liquid rocket fuel disposed in a rocket and having an inlet and an outlet,
- a source of pressurized nitrogen disposed within the rocket and in fluid connection with said fuel tank inlet,
- at least on rocket engine in the rocket being in fluid connection with said fuel tank outlet,
- a first burst diaphragm disposed in said fuel tank inlet and interrupting the fluid connection of said pressurized nitrogen and said fuel tank,
- a second burst diaphragm disposed in said fuel tank outlet and interrupting the fluid connection of said rocket engine with said fuel tank,
- a tubular cylinder having a pair of spaced walls and being secured at one end inside of said fuel tank in circumferential relationship about said fuel tank inlet,
- an internal annular flange formed at the other end of said tubular cylinder,
- a piston disposed within said cylinder and slidably movable between said fuel tank inlet and said annular flange, said piston automatically sliding within said cylinder in response to changes in fuel volume due to temperature changes,
- a plurality of circumferentially disposed openings in the inner wall of said tubular cylinder a distance from said flange at least greater than the length of said piston and providing a passage to the space between the cylinder walls,
- a plurality of circumferentially disposed openings in the outer wall of said tubular cylinder adjacent the fuel tank inlet, whereby:
    - when said pressurized nitrogen source is actuated, the gaseous flow will be directed against and rupture said first burst diaphragm to thereby permit the gas pressure to act on said piston, said piston serving to pressurize the fuel to effect rupture of said second burst diaphragm to begin uniform fuel flow to said rocket engine, and when said piston is subsequently forced against said flange the flow of nitrogen gas will enter the now exposed circumferentially disposed openings in said inner wall and be directed in a reverse direction between the walls of said cylinder before exiting through the plurality of circumferentially disposed openings in the outer wall to thereby maintain an increasing volume of gas at the inlet end of said tank to promote continuous and uniform pressurized fuel flow to said rocket engine.

References Cited

UNITED STATES PATENTS 2,979,897  4/1961  Studhalter.
3,135,092  6/1964  Dagne _____ 60—39.48
3,300,981  1/1967  Porter _____ 60—39.48

CARLTON R. CROYLE, Primary Examiner
DOUGLAS HART, Assistant Examiner

U.S. Cl. X.R.

60—39.48